F. A. AND R. D. VALENTINE.
GARDEN TRACTOR.
APPLICATION FILED NOV. 11, 1920.
1,429,178.
Patented Sept. 12, 1922.
4 SHEETS—SHEET 4.
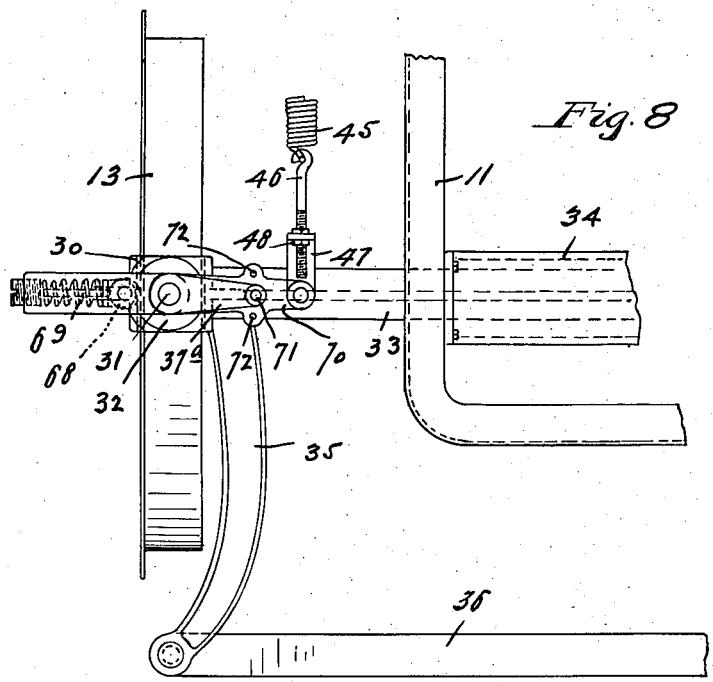
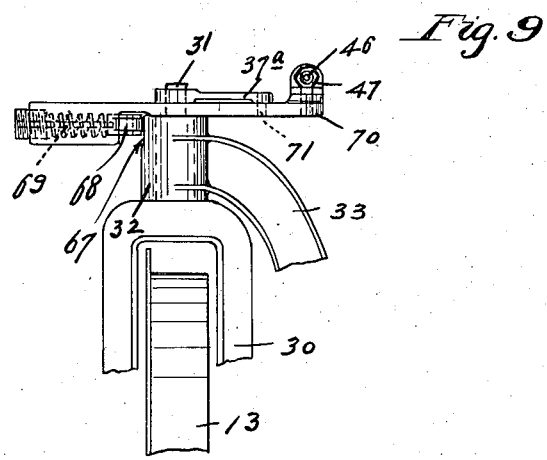
Inventors
F. A. Valentine
R. D. Valentine
By their Attorney Patented Sept. 12, 1922.

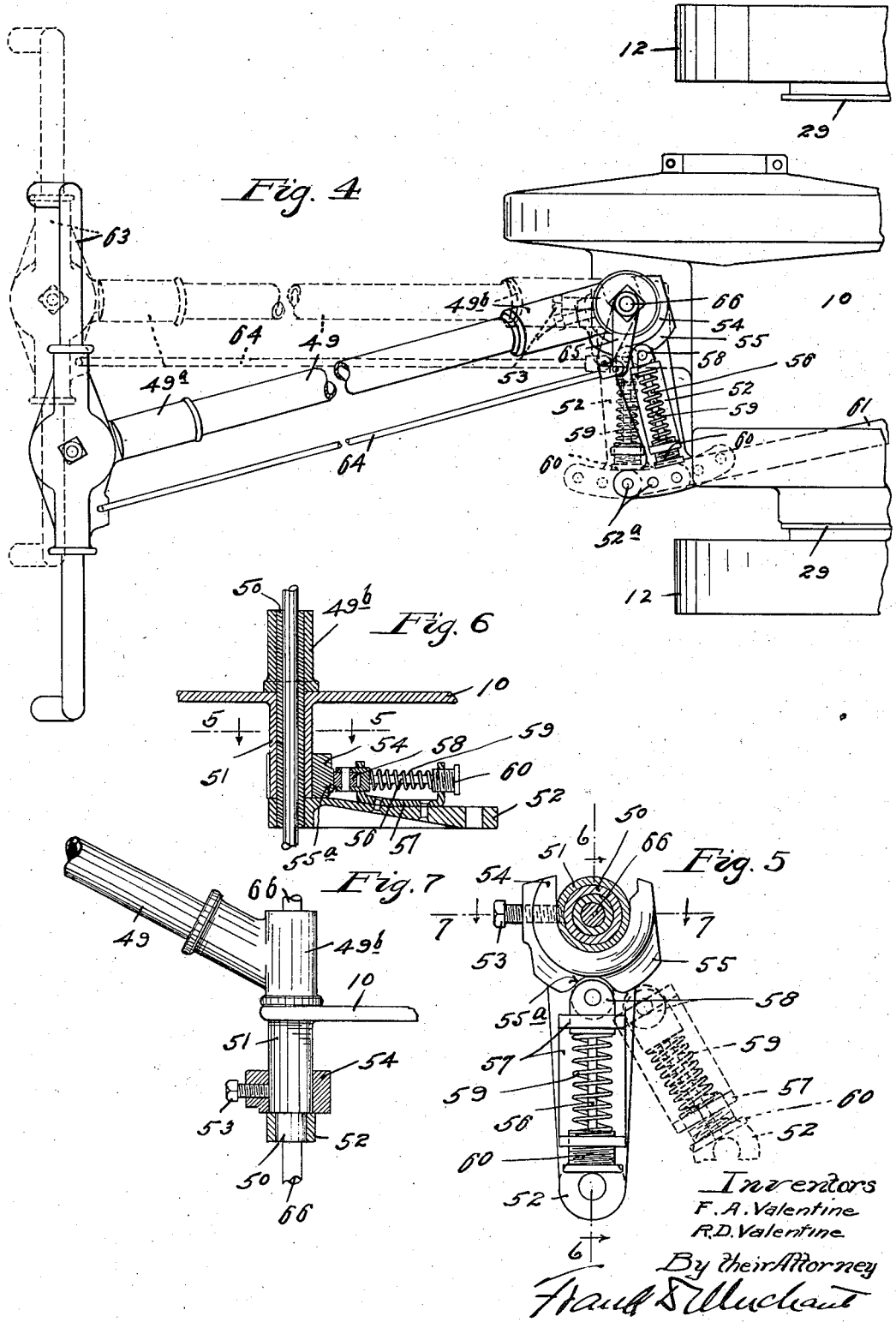

1,429,178

UNITED STATES PATENT OFFICE.

FREDRICK A. VALENTINE AND ROBERT D. VALENTINE, OF MINNEAPOLIS, MINNESOTA.

GARDEN TRACTOR.

Application filed November 11, 1920. Serial No. 423,300.

*To all whom it may concern:*

Be it known that we, FREDRICK A. VALENTINE and ROBERT D. VALENTINE, citizens of the United States, residing at Minneapolis in the county of Hennepin and State of Minnesota, have invented certain new and useful Improvements in Garden Tractors; and we do hereby declare the following to be a full, clear, and exact description of the invention, such as will enable others skilled in the art to which it appertains to make and use the same.

Our invention relates to tractors, and more particularly to that type of tractor frequently designated as a garden tractor and which, is adapted to be controlled through the manipulation of an oscillatory steering post, by a person walking or riding at the rear of the tractor.

A tractor of the above general type is exemplified in our pending application Serial Number 364,011, filed March 8, 1920, and entitled "Power driven cultivating machine." In said type of tractor, the main weight of the load is carried on rear traction wheels driven from an engine on the tractor frame, through a differential gear mechanism, and a minor part of the load is carried on front steering wheels that are mounted for oscillatory steering movements. The oscillatory steering movements of the front wheels are controlled by oscillatory movements of a rearwardly extended steering post, which, in accordance with one feature of the invention, is adapted to be either in a direct rearwardly extended position or in an oblique position at one side of the tractor, when set in a neutral position, that is, in a position for straight ahead travel of the machine.

The tractor is preferably designed of sufficient size and power to draw a full-size plow, and when made of such size, we have found, in practice, that the steering of the tractor, especially when pulling a heavy load and making a short turn, requires very considerable power to be applied to the steering post, so that the control of the travel of the tractor is not then an easy matter and is objectionably tiresome to the operator.

An important feature of the present invention is directed to frictional brakes and brake-actuating connections whereby the setting of the front wheels in angular positions, by oscillation of the steering post, automatically sets the friction brake on that side of the tractor toward which the turn is to be made, and the power of the engine is then brought into action to affect the completion or continuation of the turning of the machine in the one direction or the other. In fact, the initial angular movement of the front wheels, in a direction to cause the traction to turn toward the left, for example, will put the left-hand friction brake under frictional strain to stop rotation of the left-hand traction wheel, while leaving the right-hand traction wheel free to be driven from the engine through the differential gear mechanism; and when angular movements of the front wheel are increased for shorter turning of the tractor, the left-hand brake will be set under increasing friction. The converse statement in respect to turning of the machine toward the right is also true. As another important novel feature, there is provided a so-called "steering gear centering device" that functions to normally yieldingly hold the steering gear in a central or neutral position, for straight ahead travel of the tractor. Certain other novel features will hereinafter be noted and claimed.

In the drawings, which illustrate the invention, like characters indicate like parts throughout the several views.

Referring to the drawings—

Fig. 4 is a plan view partly in diagram showing the rear portion of the tractor;

Fig. 5 is a plan view of the pivotal connection between the oscillatory steering post and the supporting frame and showing also certain associated parts, some parts being sectioned on the line 5—5 of Fig. 6;

Fig. 6 is a section on the line 6—6 of Fig. 5;

Fig. 7 is a view partly in side elevation but with some parts sectioned on the line 7—7 of Fig. 5;

Fig. 8 is a fragmentary plan view illustrating a modified manner of applying the so-called steering gear centralizer; and Fig. 9 is a fragmentary front elevation of certain parts shown in Fig. 8.

Figure 1:
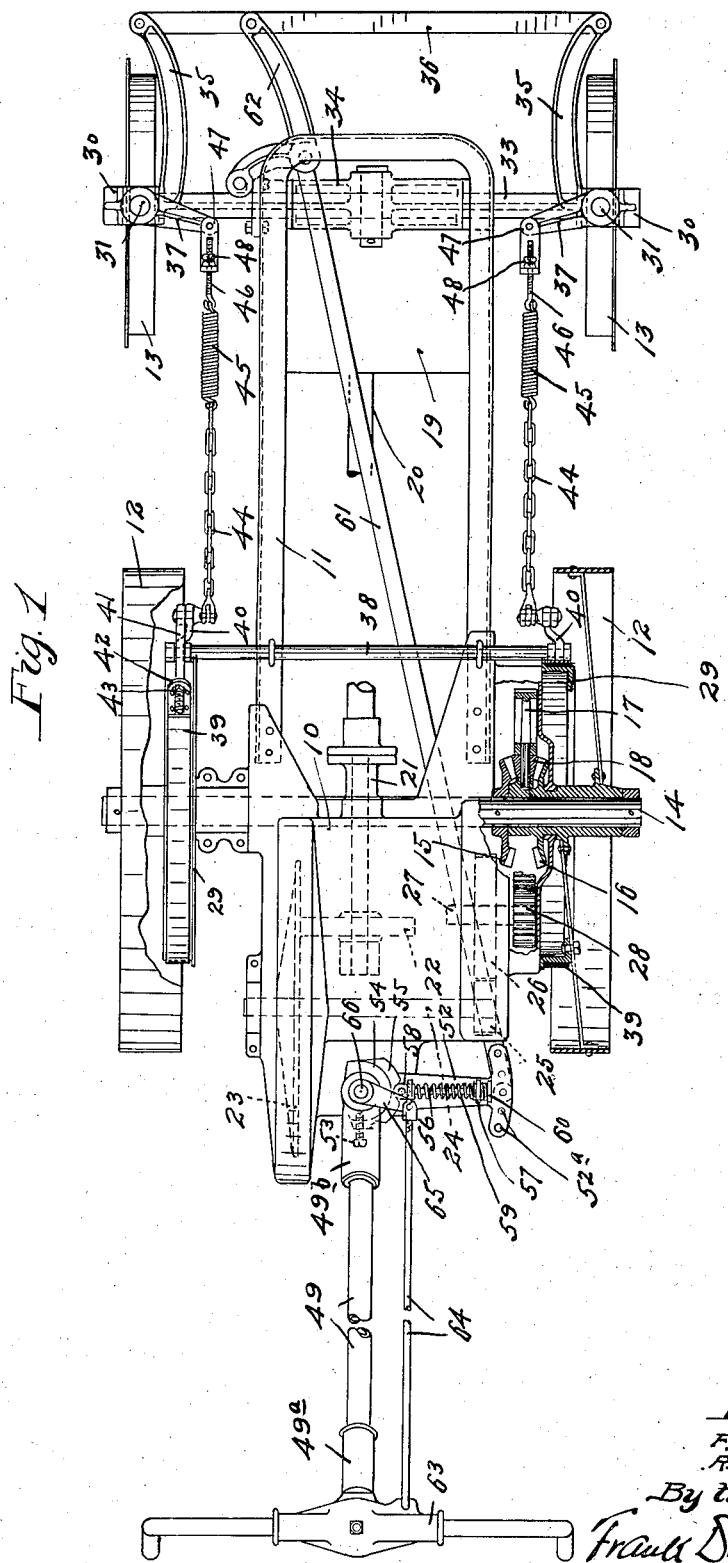
Fig. 1 is a plan view of the tractor, with some parts sectioned.

The construction illustrated in the main views, towit: Figs. 1 to 7, inclusive, will first be described.

The tractor has a suitable framework, which, as shown, comprises a large base casting 10 and a forwardly extended U-shaped rolled steel frame section 11, which parts are rigidly connected. This framework is supported by rear traction wheels 12 and angularly adjustable front steering wheels 13. Mounted in suitable bearings on the base casting 10 is a transverse rear axle 14, on one end of which the right-hand traction wheel 12 is loosely journaled and to the other end of which axle the other traction wheel 12 is rigidly secured. The two traction wheels are driven through a suitable differential gear mechanism, which, as shown, comprises two facing bevel gears 15 and 16, a master gear 17 and bevel pinions 18. The master gear 17 is loosely journaled on the axle 14 and the pinions 18 are carried thereby and mesh with the opposing bevel gears 15 and 16 and co-operate therewith in the customary way. The bevel gear 15 is secured to the axle 14, while the bevel gear 16 is loose on said axle but rigidly secured to the hub or other portion of the right-hand traction wheel 12, so that it rotates with said latter noted traction wheel.

Power for driving the tractor will preferably be afforded by a multi-cylinder internal combustion engine 19 diagrammatically indicated in Fig. 1, supported from the front portion of the frame section 11. The crank shaft of this engine is connected to a transmission shaft 20, the rear portion of which is journaled in a bearing 21 on the base casting 10, and is extended on through said bearing and, in the construction illustrated, is provided with a peripheral friction wheel 22. This face friction wheel 22 engages a peripheral friction wheel or disk 23 secured to a short transverse shaft 24 journaled in suitable bearings on the base casting 10, and provided with a spur pinion 25. The pinion 25 meshes with a spur gear 26 that is secured on another short shaft 27 that is journaled in bearings on the base casting 10 and is provided with a spur pinion 28 that meshes with the external teeth of the master gear 17 of the differential gear mechanism.

Any suitable or well known means will be provided for moving the friction wheel 22 toward and from the axis of the friction wheel 23, so as to produce variable speed of the tractor. However, it will be understood that so far as this invention is concerned, any suitable form of differential gear mechanism and any suitable transmission mechanism between the engine and the differential gear mechanism may be employed. Each traction wheel 12, at its inner side, carries a brake drum 29 rigidly secured thereto for rotation therewith.

The angularly adustable front or stering wheels 13 are journaled in the yokes of wheel brackets 30, which, at their upper ends, are provided with upright trunnions 31 that are journaled in bearings 32 formed in the ends of a front axle 33. This front axle, at its central portion, is shown as pivotally connected to a bolster 34 that is rigidly secured to the front portion of the frame section 11, so that the axle 33 may oscillate vertically and transversely of the machine to adapt all of the four wheels of the tractor always to maintain contact with the ground. The pivotal connection between the axle 33 and the bolster 34 does not, however, permit said axle to oscillate horizontally.

The wheel brackets 30, as shown, are provided with forwardly projecting arms 35 that are connected by a connecting bar or rod 36 that holds the wheels 13 for parallel steering movements. The trunnions 31 of said wheel brackets are provided with rigidly secured inwardly projecting brake-actuating arms 37, which perform important functions already referred to and hereinafter more fully described.

Figure 2:
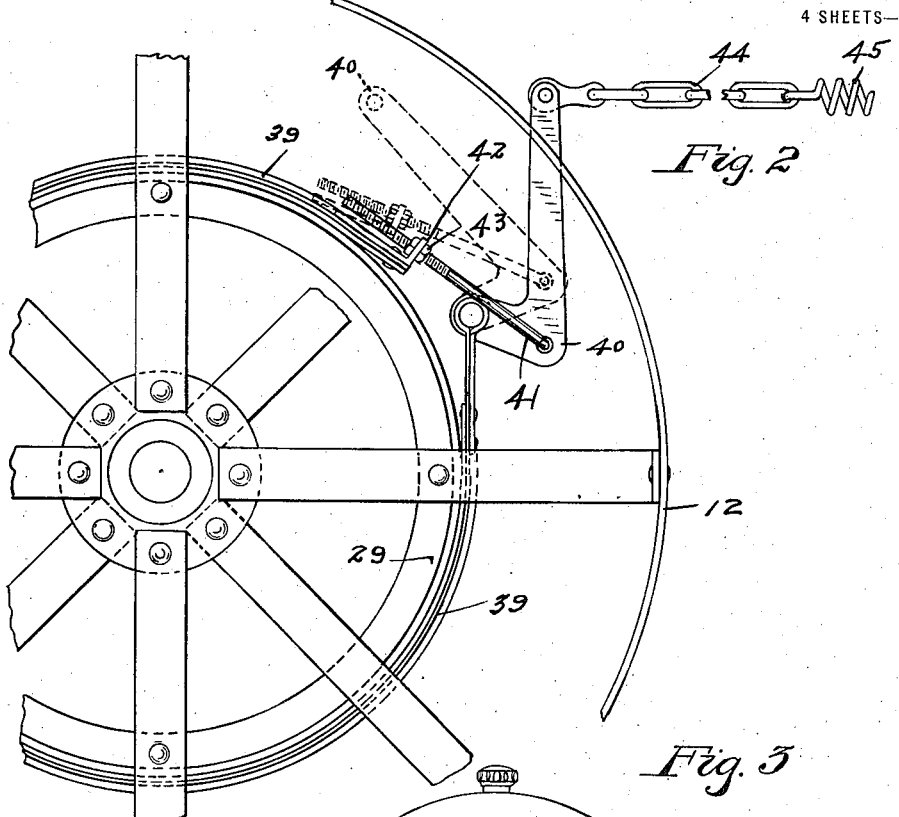
Fig. 2 is a fragmentary side elevation showing a portion of one of the traction wheels and the friction brake therefor.
Figure 3:
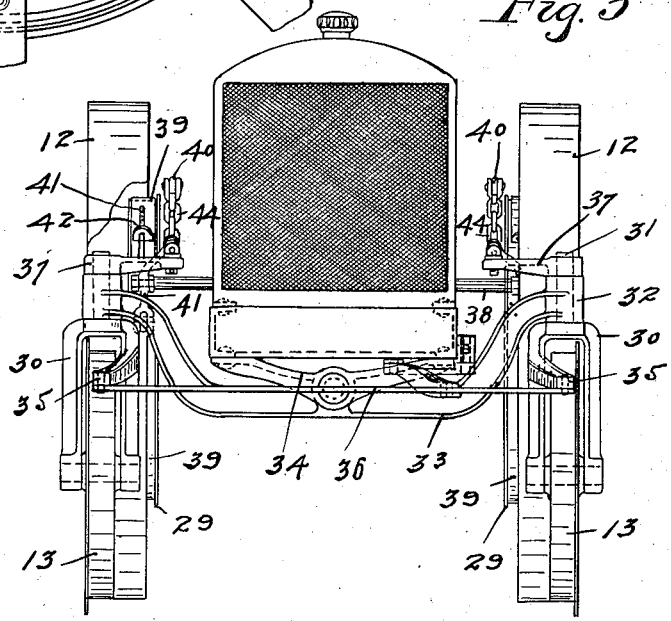
Fig. 3 is a front elevation of the tractor.

The numeral 38 indicates a fixed cross rod or shaft that is rigidly anchored to the machine frame and is extended transversely of the machine in front of the brake drums 29, (see particularly Figs. 1 and 2.) This so-called cross rod or shaft 38 affords anchors for brake bands 39 and pivotal supports for levers 40. Said brake bands surround and co-operate, one with each of the brake drums 29 and are anchored, at one end, each to one end of said rod 38. The two levers 40 are independently pivoted on the ends of said rod, and, as shown, said levers are of angular form, being provided with offset elbow-like portions to which band-connecting rods 41 are pivoted. The extended threaded portions of said rods 41 are passed through perforations in lugs 42 secured to the free ends of the respective brake bands, and on said threaded ends are nuts 43, which permit adjustments to compensate for varying length, wear and so forth, of the brake bands.

The upper ends of the brake levers 40 are independently connected to the brake-operating arms 37 of the steering wheel brackets, and, as shown, these connections are as follows: The numeral 44 indicates chains attached to the upper ends of the brake levers 40 and to closely coiled tension springs 45, which springs, at their front ends, are provided with threaded coupling bolts 46. The coupling bolts 46 are passed through perforations in the upturned ears of coupling heads 47 that are pivoted to the respective arms 37. To anchor the bolts 46 to the heads 47 and to provide for longitudinal adjustments of the flexible cable-like connections between the levers 40 and arms 37, said coupling bolts 46 are provided with nuts 48 applied thereto forward of the ears of said heads 47.

The oscillatory steering post may be of any suitable form, but, as shown, comprises a metal tube 49 having a rear end head 49$^a$ and a front end head 49$^b$, which latter is rigidly secured to a depending sleeve 50 journaled in a suitable sleeve-like bearing 51 that depends from the base casting 10. For this and other details about to be described, attention is particularly called to Figs. 1 and 4 to 7, inclusive. Rigidly secured to the lower end of the oscillatory sleeve 50 is an arm 52, and rigidly but adjustably secured on the lower end of the fixed sleeve-like bearing 51, by means of a set screw 53, is a yoke-like or open-sided hub 54. This so-called hub 54, at its rear side, is provided with a cam flange 55, the outer edge of which is concentric to the axis of the sleeve 50, but, at its central portion, is provided with a cam-acting depression 55$^a$.

For co-operation with the notched cam-acting flange 55—55$^a$, we provide the arm 52 with a spring-pressed centering plunger that co-operates with said cam flange or with a similar element to form what is herein designated as a steering gear centering device, and the function of which is to yieldingly hold the steering gear in a central or neutral position in which the front steering wheels 13 will be parallel to the rear traction wheels and the machine set for straight ahead travel.

As illustrated in the drawings, this centering device comprises a plunger 56 that works in a bearing bracket 57 secured on the arm 52 and is provided, at its inner end, with a roller 58 that is engageable with the flange 55 and its notch 55$^a$. The plunger 56 is yieldingly pressed inward by a coiled spring 59 that surrounds the same and is compressed between the head thereof and an abutment screw 60 that works with threaded engagement in the outer lug of the bracket 51. As shown, the outer end of the plunger 56 works directly in said screw 60.

At its free end, the arm 52 has a segmental head provided with circumferentially spaced perforations 52$^a$, (see particularly Figs. 1 and 6). The numeral 61 indicates a long connecting rod, the rear end of which is pivotally and adjustably connectible to any one of the perforations 52$^a$ of the arm 52, and at its front end, is pivotally connected to the offset elbow or portion of a lever 62, which, at one end, is pivotally connected to the front axle and, at its other end, is pivotally connected to the steering arm connecting bar or rod 36.

This tractor is adapted to be used in connection with plows, cultivators or other ground-working implements, which, in a manner more fully disclosed in our pending application above identified, are adapted to be swung laterally in respect to the tractor by manipulation of a handle bar that is pivoted to the free rear end of said steering post. For the purposes of this case, it is sufficient to note that for the purpose above stated, a suitable transverse handle bar 63 is intermediately pivoted to the rear head 49$^a$ of the handle bar and is connected by a rod 64 to an arm 65 secured on the upper end of an upright shaft 66 that is extended through and journaled in the sleeve 50, already noted. By oscillation of the shafts 66, the offsetting of the ground-working implements may be accomplished by suitable means, such as that disclosed in our said pending application, but not necessary for the purposes of this case to further consider.

*Operation.*

The operation, in a general way, has already been indicated, but, more definitely described, is substantially as follows:

In the adjustment of the so-called steering post 49 illustrated in Fig. 1, said post will be in a central rearwardly projected neutral or normal position when the steering gear or mechanism is set for straight ahead travel of the tractor, that is, with the front or steering wheels parallel to the traction wheels; but, in the adjustments of the parts shown by full lines in Fig. 4, said steering post is set in an oblique or laterally offset position, while the steering gear and steering wheels are still set as before noted for straight ahead travel of the machine. To adjust the steering post from its central neutral position to its oblique offset neutral position, the arm 52 is moved forward and the rear end of the connecting rod 61 is pivotally connected to a more rearward perforation 52 of said arm, and then to establish the old relation between said arm and the cam flange 55, the latter is correspondingly moved forward so that the plunger roller 58 will still be engaged with the cam notch 55$^a$ of the cam flange 55. Thus, it will be seen that to maintain the neutral or centered condition of the steering gear, it is necessary for all adjustments of the steering post to readjust parts so as to maintain normal contact between said roller and cam notch 55$^a$. Obviously, the steering post can be set in a neutral position either at the right or at the left, the adjustment toward the left, in the construction illustrated, requiring pivotal connection between the rear end of the rod 61 and one of the forward perforations 52$^a$ of the arm 52. It is further important to note that in all neutral adjustments of the steering gear and of the steering post, both of the traction wheel brakes will be released, so that two traction wheels will be driven by force transmitted freely and equally thereto. Hence, under these conditions, there is preferably some slack in the chains 44 and co-operating cable-forming elements.

When it is desired to cause the machine to turn toward the left, for example, this steering action, in the direction stated, may be primarily established by oscillating the steering post 49 toward the right. The immediate effect of this is to set the front wheels 13 obliquely for a turning movement toward the left, but the very act of doing this will set the traction wheel brake, at the left, under a friction proportional to the abruptness of the turn provided for by the setting of the steering wheels, so that the rotation of the left-hand traction wheel is then retarded and the rotation of the right-hand traction wheel is accelerated through the differential gear mechanism. Moreover, because of the yielding actions of the springs 45, the retardation of the left-hand traction wheel and the acceleration of the right-hand traction wheel will be approximately proportional to the abruptness of the turn for which the steering wheels are set. Obviously, when the steering post 49 is oscillated toward the left, the actions just described will be reversed.

The importance of the steering action above described will be further apparent when it is considered that the steering action is produced not only by the proper and positive setting of the steering wheels, but by the co-operating power of the engine, which is brought into action by the very act of setting said steering wheels in their proper angular positions. Stated in still another way, the steering wheels are set so that the tractor, when moved forward, will turn the proper curve, and the driving force is differentially applied to the traction wheels in a manner which, in itself, will naturally make the tractor travel such curve. In this way, the work that the operator performs in the steering action is made very light and the steering of the tractor is made certain and positive.

In spite of what has been above said, it will be understood that when it is desired to cause, for example, the righthand steering wheel to run in a furrow and to automatically follow a furrow, the adjustments between the connecting rod 61 and the head of the arm 52 may be so set as to cause the steering wheels to crowd slightly toward the left and, hence, cause the righthand steering wheel to crown against, but not to climb, the straight side of the furrow.

In the modified arrangement illustrated in Figs. 8 and 9, a modified form of the steering gear centering device is illustrated, and, in this arrangement, one of the sleeve-like end bearings 32, of the front axle 33, has a flattened surface 67 that is engaged by a roller 68 carried by the inner end of an inwardly spring-pressed plunger 69 mounted in one end of a lever 70, that is intermediately pivoted on the upper end of one of the wheel bracket trunnions 31. In this arrangement, the steering arm 37ª, that corresponds in some respects to one of the arms 37 previously described, is rigidly secured to the upper end of said trunnion 31 and is adjustably securable to the lever 70 by a pin 71 that is insertable into any one of several perforations 72 in said lever 70. In this arrangement, one of the coupling heads 47 is attached to the inner end of the lever 70.

With this arrangement, the brake device will be operated on the general plan already described, but the adjustment of the elements of the centering device does not need to be changed when the steering post is set from one to another of its neutral positions, to wit: either directly rearward or obliquely at one side of the tractor. The centering device may be applied either to one or to both of the steering wheel brackets.

What we claim is:

1. A tractor having an oscillatory ground-engaging steering wheel, and a manually actuated rearwardly extended steering handle pivotally mounted at its front end for oscillatory movements transversely of the tractor, and operatively connected to said steering wheel while occupying a position at one side of said tractor and while thus operatively positioned for straight-ahead travel of the tractor.

2. A tractor having an oscillatory steering wheel, a manually operated steering handle, and operative connections between said handle and steering wheel including an adjustable coupling that permits said handle to be set at will, either extended directly rearward or at one side of the tractor while positioned for straight ahead travel of the tractor.

3. A tractor having laterally spaced traction wheels, a propelling motor, differential gear for differentially driving said traction wheels from said motor, and steering means including a steering wheel, and a laterally oscillatory steering post, combined with a steering gear centering device normally operative to yieldingly hold said steering post in a neutral position and the steering gear set for straight ahead travel of the tractor.

4. A tractor having laterally spaced traction wheels, a propelling motor and differential gear for differentially driving said traction wheels from said motor and steering means including a steering wheel, a laterally oscillatory steering post, combined with a steering gear centering device normally operative to yieldingly hold said steering post in a neutral position and the steering gear set for straight ahead travel of the tractor, and means for setting said steering post in different neutral positons transversely of the tractor.

5. A tractor having laterally spaced traction wheels, a propelling motor, a differential gear for differentially driving said traction wheels from said motor, steering mechanism including a steering wheel and an oscillatory steering post, combined with a steering gear centering device normally operative to yieldingly hold said steering gear adjusted for straight ahead travel of the tractor, with said steering post extended obliquely to one side of the tractor.

6. A tractor having laterally spaced traction wheels, a propelling motor, a differential gear for differentially driving said traction wheels from said motor, steering mechanism including a steering wheel and an oscillatory steering post, combined with a steering gear centering device normally operative to yieldingly hold said steering gear adjusted for straight ahead travel of the tractor, with said steering post extended obliquely to one side of the tractor, and means whereby, at will, said steering post may be set in different transverse positions, while the steering gear is in neutral adjustment.

7. A tractor having laterally spaced traction wheels, a propelling motor, differential transmission mechanism for differentially driving said traction wheels from said tractor, and steering means including a steering wheel and a rearwardly extended laterally swinging steering post, combined with independent friction brakes, one for each of the traction wheels, actuated automatically by said steering gear and operative to set the brake and retard the traction wheel that is on that side toward which the steering wheel is set to turn the tractor.

8. A tractor having traction wheels, steering wheels, a rearwardly extended laterally swinging steering post having connections for oscillating said steering wheels, friction brakes, one for each of said traction wheels, and independent brake-setting connections actuated automatically to set the brake and retard the traction wheel that is on that side toward which said steering wheels are set to turn the tractor.

9. A tractor having traction wheels, steering wheels, a rearwardly extended laterally swinging steering post having connections for oscillating said steering wheels, friction brakes, one for each of said traction wheels, and independent brake-setting connections actuated automatically to set the brake and retard the traction wheel that is on that side toward which said steering wheels are set to turn the tractor, said brake-setting connections including springs for the purpose set forth.

10. A tractor having traction wheels, steering wheels, wheel brackets to which said steering wheels are journaled, a propelling motor, differential transmission mechanism for differentially driving said traction wheels from said motor, a friction brake for each traction wheel, each including a brake lever, arms connected to oscillate with said steering wheel brackets, flexible yielding connections between said arms and the respective brake levers, and a rearwardly extended transversely oscillatory steering post connected to said steering wheel brackets and operating substantially as described.

11. A tractor having traction wheels, steering wheels, a steering gear, a propelling motor and differential transmission mechanism, combined with independent friction brakes, one for each traction wheel, actuated by said steering gear and operative to set the brakes and retard rotation of the traction wheel that is on that side toward which the steering wheels are set to turn the tractor, and a yielding steering gear centering device tending to hold the steering gear positioned for straight ahead traveling of the tractor but adapted to yield when either of said friction brakes is set to cause the tractor to turn out of the straight line of travel.

In testimony whereof we affix our signatures.

FREDRICK A. VALENTINE.
ROBERT D. VALENTINE.